US008606862B2

(12) United States Patent
Agarwal et al.

(10) Patent No.: US 8,606,862 B2
(45) Date of Patent: Dec. 10, 2013

(54) ELECTRONIC MAIL DELAY ADAPTATION

(75) Inventors: Sharad Agarwal, Seattle, WA (US); Venkata N. Padmanabhan, Bangalore (IN); Rajatish Mukherjee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 11/894,398

(22) Filed: Aug. 21, 2007

(65) Prior Publication Data
US 2009/0055489 A1 Feb. 26, 2009

(51) Int. Cl.
*G06F 15/16* (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| | | | |
|---|---|---|---|
| 6,163,809 A | 12/2000 | Buckley | |
| 6,243,739 B1 | 6/2001 | Schwartz et al. | |
| 6,560,648 B1 | 5/2003 | Dunn et al. | |
| 6,650,440 B1 | 11/2003 | Wing | |
| 6,658,485 B1 | 12/2003 | Baber | |
| 6,757,830 B1 | 6/2004 | Tarbotton et al. | |
| 6,782,414 B1 | 8/2004 | Xue et al. | |
| 6,810,235 B2 | 10/2004 | Smith et al. | |
| 6,854,007 B1 | 2/2005 | Hammond | |
| 7,111,047 B2 | 9/2006 | McCarthy et al. | |
| 7,181,495 B2 | 2/2007 | Skladman et al. | |
| 7,240,095 B1 | 7/2007 | Lewis | |
| 7,272,662 B2* | 9/2007 | Chesnais et al. | 709/246 |
| 7,287,060 B1 | 10/2007 | McCown | |
| 7,587,760 B1 | 9/2009 | Day | |
| 2002/0054335 A1 | 5/2002 | Sekiguchi | |
| 2002/0087634 A1* | 7/2002 | Ogle et al. | 709/204 |
| 2002/0120697 A1* | 8/2002 | Generous et al. | 709/206 |
| 2002/0120705 A1 | 8/2002 | Schiavone et al. | |
| 2002/0144154 A1 | 10/2002 | Tomkow | |
| 2003/0046421 A1 | 3/2003 | Horvitz et al. | |

(Continued)

FOREIGN PATENT DOCUMENTS

| | | |
|---|---|---|
| EP | 1617359 A1 | 1/2006 |
| JP | 2004-032042 A | 1/2004 |

(Continued)

OTHER PUBLICATIONS

Sharad Agarwal, et al, SureMail: Notification Overlay for Email Reliability, Mar. 2005, pp. 1-6.*

(Continued)

*Primary Examiner* — Joon H Hwang
*Assistant Examiner* — Suraj Joshi

(57) ABSTRACT

A electronic communication system that can detect and adapt to delays in delivery of e-mail messages. The system may adapt to delays by using other mechanisms to convey the information intended for delivery by e-mail. The mechanism may convey the information to the recipient once the delayed electronic mail message is received by the recipient's e-mail system. In this respect, the recipient may make arrangements to receive information in the e-mail message when the recipient expects to be away from his or her e-mail system. Additionally or alternatively, the recipient may choose to initiate out-of-band communication to the sender when the recipient receives an indication of a delayed electronic mail message.

20 Claims, 11 Drawing Sheets

(56) References Cited

U.S. PATENT DOCUMENTS

| | | |
|---|---|---|
| 2003/0069932 A1 | 4/2003 | Hall et al. |
| 2004/0030916 A1 | 2/2004 | Karamchedu et al. |
| 2004/0064511 A1 | 4/2004 | Abdel-Aziz et al. |
| 2004/0078441 A1 | 4/2004 | Malik et al. |
| 2004/0117456 A1 | 6/2004 | Brooks |
| 2004/0128359 A1 | 7/2004 | Horvitz et al. |
| 2004/0143636 A1 | 7/2004 | Horvitz et al. |
| 2004/0203351 A1* | 10/2004 | Shearer et al. ............... 455/41.1 |
| 2004/0203606 A1 | 10/2004 | Souissi et al. |
| 2004/0254998 A1 | 12/2004 | Horvitz |
| 2005/0015450 A1 | 1/2005 | Keohane et al. |
| 2005/0041789 A1 | 2/2005 | Warren-Smith et al. |
| 2005/0044150 A1 | 2/2005 | Kaminsky et al. |
| 2005/0089019 A1 | 4/2005 | Salim et al. |
| 2005/0196030 A1 | 9/2005 | Schofield et al. |
| 2005/0210116 A1 | 9/2005 | Samson |
| 2005/0268237 A1 | 12/2005 | Crane et al. |
| 2006/0020799 A1 | 1/2006 | Kemshall |
| 2006/0036695 A1 | 2/2006 | Rolnik |
| 2006/0041583 A1 | 2/2006 | Horvitz |
| 2006/0072721 A1 | 4/2006 | Wisniewski |
| 2006/0149816 A1 | 7/2006 | Cadiz et al. |
| 2006/0190598 A1 | 8/2006 | Cabrera |
| 2007/0005970 A1 | 1/2007 | Trupp et al. |
| 2007/0067399 A1 | 3/2007 | Kulkarni et al. |
| 2007/0086403 A1 | 4/2007 | Hatakeyama et al. |
| 2007/0086592 A1* | 4/2007 | Ellison et al. ............... 380/282 |
| 2007/0097865 A1 | 5/2007 | Song et al. |
| 2007/0106737 A1 | 5/2007 | Barnes et al. |
| 2007/0153329 A1 | 7/2007 | Sugawara et al. |
| 2007/0233789 A1 | 10/2007 | Agarwal et al. |
| 2007/0233790 A1 | 10/2007 | Agarwal et al. |
| 2007/0271345 A1 | 11/2007 | Callanan |
| 2008/0244698 A1 | 10/2008 | Takatsuji |
| 2008/0276180 A1 | 11/2008 | Zacarias et al. |
| 2008/0285558 A1 | 11/2008 | Wu |
| 2009/0055490 A1 | 2/2009 | Agarwal et al. |
| 2009/0055491 A1 | 2/2009 | Agarwal et al. |
| 2009/0055502 A1 | 2/2009 | Agarwal et al. |

FOREIGN PATENT DOCUMENTS

| | | |
|---|---|---|
| JP | 2004-032448 A | 1/2004 |
| WO | WO 00/67435 | 11/2000 |
| WO | WO 01/03386 | 1/2001 |

OTHER PUBLICATIONS

Agarwal, et al, SureMail: Notification Overlay for Email Reliability, Mar. 2005, pp. 1-6.*

Moore, K., An Extensible Message Format for Delivery Status Notifications, Network Working Group, Jan. 1996.

Sivakumar, S., A critical survey of protocols proposed by the IETF as enablers for customer interaction in an electronic customer relationship management system—Part II—Protocol Suite, Computing and Information Group, St. Mary's University, 2002.

Newman, D., Deliver by SMTP Service Extension, Sun Microsystems, Jun. 2000.

Agarwal et al., SureMail: Notification Overlay for Email Reliability, Mar. 2005.

IntraSCAN—Frequently Asked Questions, IntraSource, The Value of Solutions, The Power of Results, 2003.

Agarwal et al., "Addressing Email Loss with SureMail: Measurement, Design, and Evaluation," May 2006, pp. 1-15.

Bernheim Brush, A.J. et al., "Notification for Shared Annotation of Digital Documents," Apr. 2002.

Fitzpatrick, G. et al., "Instrumenting and Augmenting the Workaday World with a Generic Notification Service called Elvin," submitted 1999.

International Search Report and Written Opinion for International Application No. PCT/US2008/073470 mailed Mar. 9, 2009.

Maraboli, M. et al., "A Methodology and Architecture for a Dependable and Secure E-mail Service," received Oct. 2006.

Office Action mailed Sep. 16, 2011 in U.S. Appl. No. 11/894,428.

U.S. Appl. No. 11/894,425, Including O/As dated Sep. 2, 2009; Feb. 18, 2010; Sep. 15, 2010; Mar. 4, 2011; Sep. 16, 2011; Mar. 15, 2012; Jul. 20, 2012; and any future O/As.

11/894,427, Including O/As dated Sep. 17, 2009; Mar. 29, 2010; Sep. 15, 2010; Mar. 3, 2011; Sep. 29, 2011; Mar. 16, 2012; and any future O/As.

11/894,428, Including O/As dated Sep. 16, 2009; Apr. 14, 2010; Sep. 30, 2010; Mar. 22, 2011; Sep. 16, 2011; and any future O/As.

About.com:Email; "What Happened to my mail?"; retrieved at http://email.about.com/library/weekly/aa082597.htm; Aug. 25, 1997; 2 pages.

Linux and Open Source Blog; Gnome Apps: Mail Notification:; retrieved at http://linux.wordpress.com/2007/04/16/gnome-apps-mail-notification/; Apr. 16, 2007; 7 pages.

"The Way of Email: Routings and Reasons for Occasional Delays"; i/s Back Issues; vol. 11, No. 4; Dec. 1995; 2 pages.

International Search Report and Written Opinion for International Application No. PCT/US2008/073506, mailed Mar. 11, 2009.

Afergan, "The State of the Email Address", ACM SIGCOMM Computer Communications Review, Jan. 2005.

"Amazon Simple Storage Service (Amazon S3)", Published on or before Nov. 24, 2006 as indicated at http://web.archive.org/web/20070210023839/http://www.amazon.com/S3-AWS-home-page-Money/b?ie=UTF8&node=16427261.

"UC Berkeley Enron Email Analysis Project", Published on or before Jan. 27, 2007 as indicated at http://web.archive.org/web/20070127003959/http://bailando.sims.berkeley.edu/enron_email.html.

Cringely, "In A Jam", Previously Cited as "Silent Email Loss by EarthLink", http://www.pbs/cringely/pulpit/2006/pulpit_20061201_001274.html, Dec. 1, 2006.

"ePOST Serverless Email System: A Peer-to-Peer Platform for Reliable, Secure Communication", Published on or before Aug. 16, 2004 as indicated at http://web.archive.org/web/20070205154834/http://www.epostmail.org/.

Fajman, "An Extensible Message Format for Message Disposition Notifications", National Institutes of Health, Mar. 1998.

Garriss, "RE: Reliable Email", Proceedings of the 3rd Symposium on Networked Systems Design and Implementation, May 2006.

Mislove, "Post: A Secure, Resilient, Cooperative Messaging System", Proceedings of HotOS IX: The 9th Workshop on Hot Topics in Operating Systems, May 18-21, 2003.

Moors, "Email Dependability", Bachelor of Engineering Thesis, University of New South Wales, Nov. 2004.

Saito, "Manageability, Availability and Performance in Porcupine: A Highly Scalable, Cluster-Based Mail Service", Operating Systems Review, Dec. 1999.

Ceglowski, "Elevator Pitch", Previously Cited as, "LOAF", http://loaf.cantbedone.org/, Published on or before Mar. 22, 2004 as indicated at http://web.archive.org/web/20040322013000/http://loaf.cantbedone.org/about.htm.

* cited by examiner

ELECTRONIC MAIL DELAY ADAPTATION

BACKGROUND

Electronic mail (e-mail) provides fast, sometimes apparently instantaneous, communication of many types of information. For this reason, e-mail has become widely used for both business and personal communications.

Unfortunately, e-mails can sometimes become lost or delayed. An e-mail message could be delayed or lost for any of a number of reasons, including overload, failure (e.g., disk crash), or upgrade of a server along the end-to-end, store-and-forward path from the sender to the recipient. Overload or failure is sometimes triggered by a burst in the volume of e-mail messages because of spam or the spread of a virus. Furthermore, the widespread use of spam filters also contributes to e-mail delivery problems such as by sometimes quarantining legitimate e-mail messages, delaying the e-mail until the intended recipient recognizes that the e-mail was in-fact received.

The most widely used e-mail protocol, the Simple Mail Transfer Protocol (SMTP), includes provisions for an e-mail server to automatically generate delivery delay messages when it has held an e-mail in a queue for an extended period. While such messages can improve the experience for a user, they may not be effective in all cases. For example, some corporations do not allow any such messages to be generated to protect the privacy of the corporation (e.g., it prevents an entity from verifying if an e-mail address is valid) or prevents such messages from being generated or received in at least some cases, such as when the e-mail is regarded as spam. Further, such messages cannot be generated for e-mails that experience delivery problems before reaching an e-mail server.

SUMMARY

An e-mail user experience may be improved with a system that recognizes either actual or potential e-mail delivery delays and allows an e-mail user to adapt to the delay. A possible adaptation is communication of information in the delayed e-mail to the recipient using a mechanism different than the electronic mail system (i.e., an "out-of-band communication"). The out-band-communication may convey the information to the recipient once the delayed electronic mail message is received by the recipient's e-mail system. In this respect, the recipient may make arrangements to receive information in the e-mail message when the recipient expects to be away from his or her e-mail system. Additionally or alternatively, the recipient may choose to initiate out-of-band communication to the sender when the recipient receives an indication of a delayed electronic mail message.

An actual delay may be detected using a low-latency channel to send notifications of e-mails to recipients. The notifications are likely to be received in advance of a delayed e-mail, allowing an intended e-mail recipient to detect that delivery of an e-mail has been delayed. The recipient may adapt to the delay in delivery, when a notification is received without a corresponding electronic mail message. Alternatively or additionally, the recipient may use a forwarding agent to deliver the information of the electronic mail message out-of-band to the recipient at an alternate destination.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
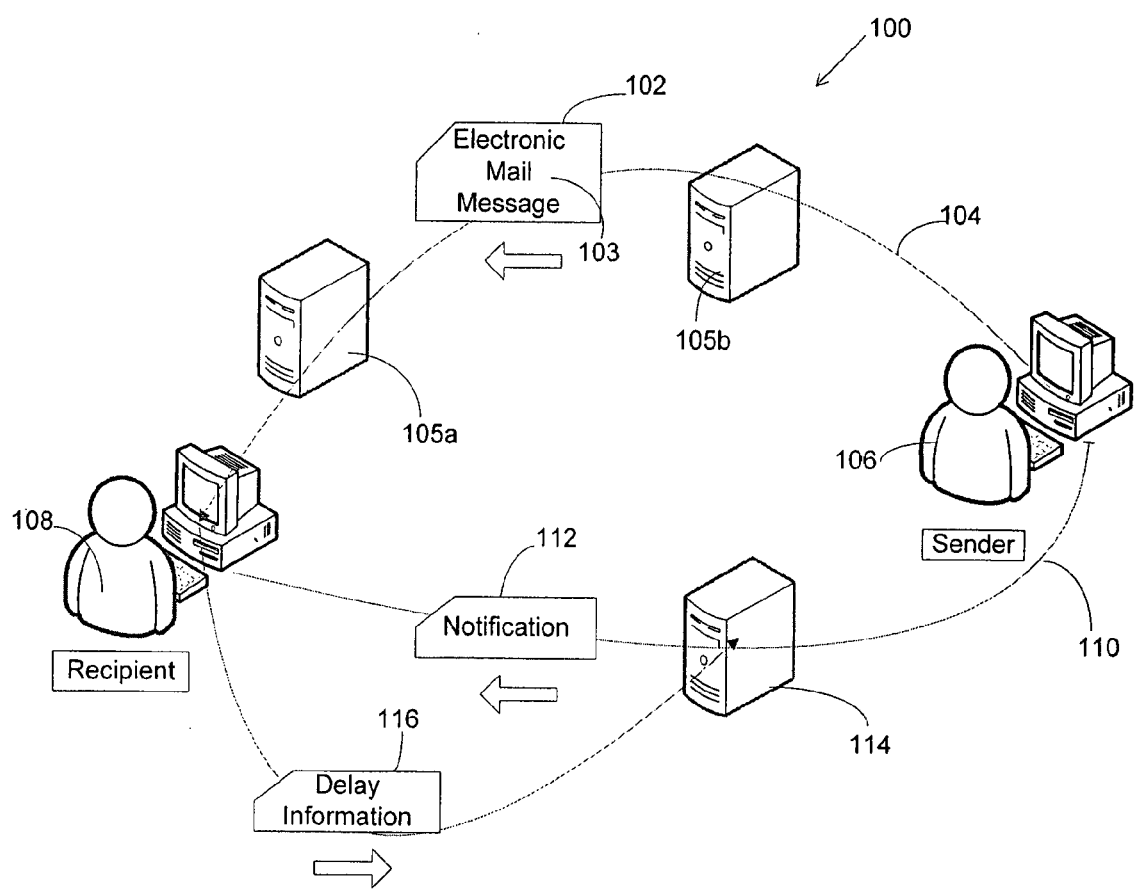
FIG. 1 is a schematic representation of an electronic mail network that utilizes delay notification, according to one embodiment.

The inventors have appreciated that existing e-mail systems do not provide sufficiently useful information about e-mail delays or potential delays to allow adaptations that are suitable in all circumstances. As a result, the inventors have appreciated that alternative mechanisms to detect and to adapt to e-mail delivery delays may significantly improve an e-mail user experience.

Delivery delays may be detected in any suitable way. The delays may be detected for a specific e-mail message based on actual transmission conditions for that e-mail message. In other embodiments, potential delays may be identified based on historical delay information collected for previously transmitted e-mail messages or other information that indicates the "health" of an e-mail system from which delivery delays may be predicted. Some examples of other ways in which delay information may be gathered include identifying present and/or past e-mail queue lengths on various e-mail servers throughout a system, and/or automatically sending periodic e-mail "heartbeats." When such heartbeats do not arrive at a recipient in an expected time, delays may be presumed to be happening.

In a system described herein, delays for a specific e-mail message may be detected using a low-latency e-mail notification channel, operated in parallel with a channel used for delivery of e-mail messages. Such a channel may convey a notification of an e-mail message sent to an intended recipient and allow the intended recipient to identify, even in advance of receipt of the e-mail message, that the e-mail message was delayed in delivery. Though, any suitable mechanism for detecting delivery delays may be used.

In embodiments in which a notification channel is used, the ultimate recipient, or any other person or device at any point along a communication path that has access to both the notification channel and the e-mail message channel, may detect the delay. As used herein, any person or device that receives a message, even if it forwards the message to another user or device, may be regarded as a "recipient." Thus, in some embodiments, a recipient will detect the delay and will therefore initiate adaptation to the delay.

A recipient may adapt to a delay by initiating communication with the sender to receive through an out-of-band communication, information intended to be communicated in an e-mail message. In the embodiments described herein, a party initiating an e-mail transmission may be referred to as the sender. However, any user or device that has access to the sent information also may be regarded as a "sender." For example, a sending e-mail server may be regarded as a "sender" in some embodiments and any such sender may transmit information in an out-of-band communication.

Any suitable out-of-band communications may be employed to adapt to a delivery delay. In some embodiments, the out-of-band communications may be an instant message or may be a form of peer-to-peer communication, including a VOIP representation of the message. Though, out-of-band communication is not limited to electronic communications. It may involve a telephone conversation or other verbal communication between the sender and the recipient. Alternatively, the out-of-band communication may be in any other suitable format.

Further, the invention is not limited to adaptations that involve using an alternative mechanism to transmit information intended to be delivered by e-mail. Any suitable adaptation may be used, including rescheduling a meeting or reacting in other ways that do not involve communication of the information intended for delivery through an e-mail message.

Also, embodiments of the invention may predict potential delivery delays and adapt to the delays before they occur, such as at the time a user composes an e-mail message. In an exemplary embodiment, the low-latency notification channel is used to detect delays in e-mail messages as they are sent. Delay information is aggregated and used to detect paths carrying e-mails that are experiencing delivery delays. Though, any suitable mechanism may be used to identify a path over which e-mail messages are likely to be delayed. For example, delivery delays may be detected by collecting e-mail transmission times and delivery times at an e-mail server as e-mails are received for distribution to recipients. Accordingly, the invention is not necessarily limited to any specific mechanism for detecting delivery delays.

Regardless of how paths over which e-mail messages are likely to be delayed are identified, as subsequent e-mail messages are composed, those that are to be sent over such a path can be identified and an adaptation can be made. In these embodiments, the sender may initiate the adaptation. As with recipient initiated adaptation, the adaptation may be in any suitable form, including out-of-band communication of the information intended to be delivered by e-mail or other reaction to the delay.

According to one embodiment, as represented in FIG. 1, a system 100 is configured to identify delays associated with the delivery of an electronic mail message 102. As shown, the system 100 includes an electronic mail channel or path 104 over which electronic mail messages may be sent between a sender 106 and a recipient 108. The channel 104 includes one or more electronic mail servers 105a, 105b, as are typically used to convey electronic mail messages 102. The network 100 also includes a low-latency notification channel 110, over which notifications 112 that correspond to each electronic mail message 102 may be sent.

The notifications 112 that correspond to each electronic mail message 102 contain a small amount of information, and in this respect, are less likely to experience delay in transmission from a sender 106 to a recipient 108. This decreased likelihood of delay facilitates identifying delays of the corresponding electronic mail message 102, which typically includes the information 103 of interest. Notification 112 may contain any suitable information to identify an e-mail message with which the notification is associated. That information may identify the sender of the e-mail, such as by e-mail address. Though, notification 112 may contain other types of information that may allow a recipient of the notification 112 to contact the sender, including information for an alternative communication channel over which the sender may be contacted and address information for that channel. Also, notification 112 may include presence information for the sender, such as whether the sender is currently in the office, so that a recipient may identify where to contact the sender. Other information in notification 112 may allow the recipient to determine whether the recipient wants to contact the sender. Such information may include a message priority or subject line key words from the message or body. However, the specific information in a notification is not critical to the invention.

Notification channel 110, in the example of FIG. 1, is shown to pass through separate servers than those used to convey e-mail messages. Any suitable networked device providing low-latency communication may be used, which may include a separate message path on one or more servers used to convey e-mail messages. Notifications 112 may be used in various ways to identify delays in the delivery of an electronic mail message 102. For example, a recipient may match notifications to e-mails received. Notifications that cannot be matched after some interval of time may be deemed to be delayed. The interval of time may be a predetermined interval, though any suitable criteria may be used to identify a delayed message.

According to the embodiment illustrated in FIG. 1, the recipient 108 may collect delay information 116 and convey this information back to a server, such as the notification server 114. The notification server 114, in turn, may aggregate the delay information to determine the existence of any delays among various paths 104 of a system. Delay information 116 may then be shared with a server of the sender 106. In this respect, the sender 106 may be alerted to the potential of a delay on path 104 either prior to or shortly after sending an e-mail message to the recipient 108.

According to another embodiment, a server of the recipient 108 may monitor incoming messages to determine whether a delay is present. In such embodiments, the delay may be identified without a notification being sent over a low-latency channel.

Figure 2A:
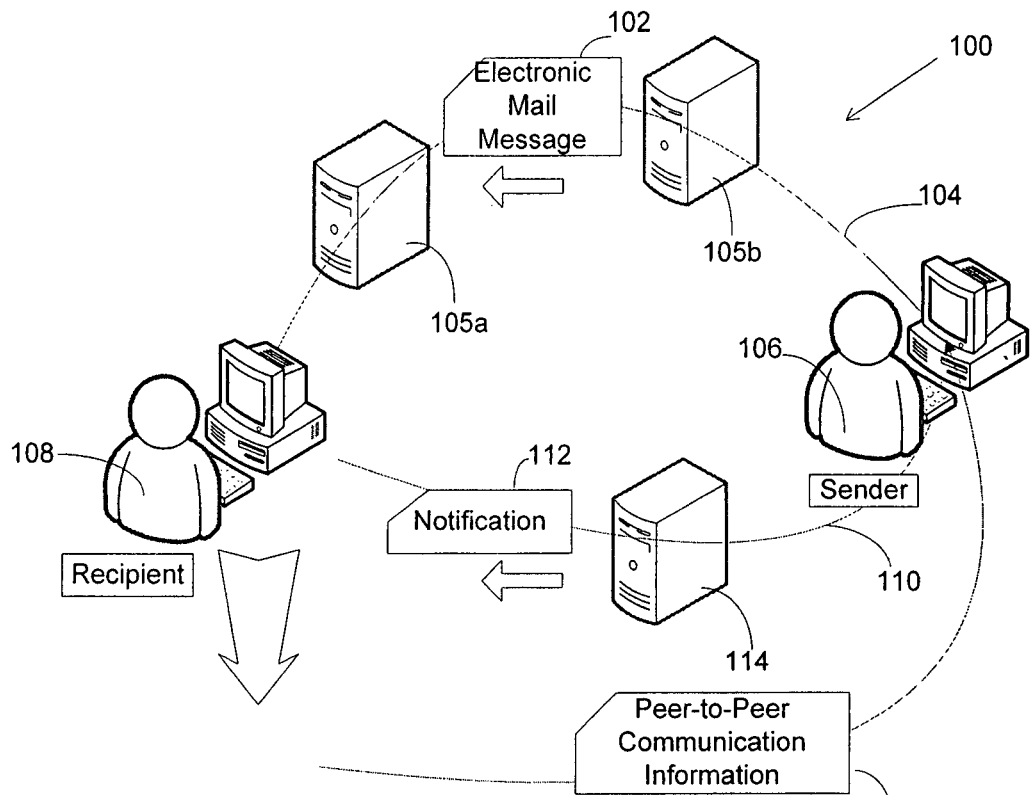
FIGS. 2a-2c are a schematic representations of electronic mail networks that provide an option for out-of-band communication in response to a delay notification, according to some embodiments.
Figure 2B:
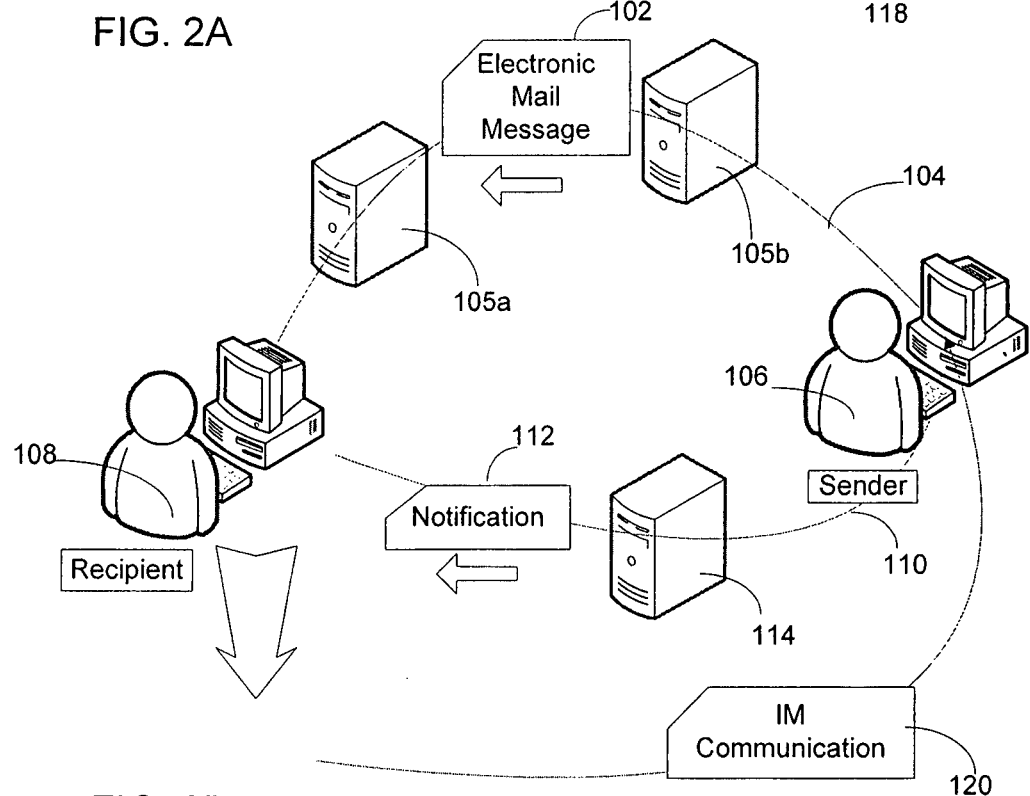
Figure 2C:
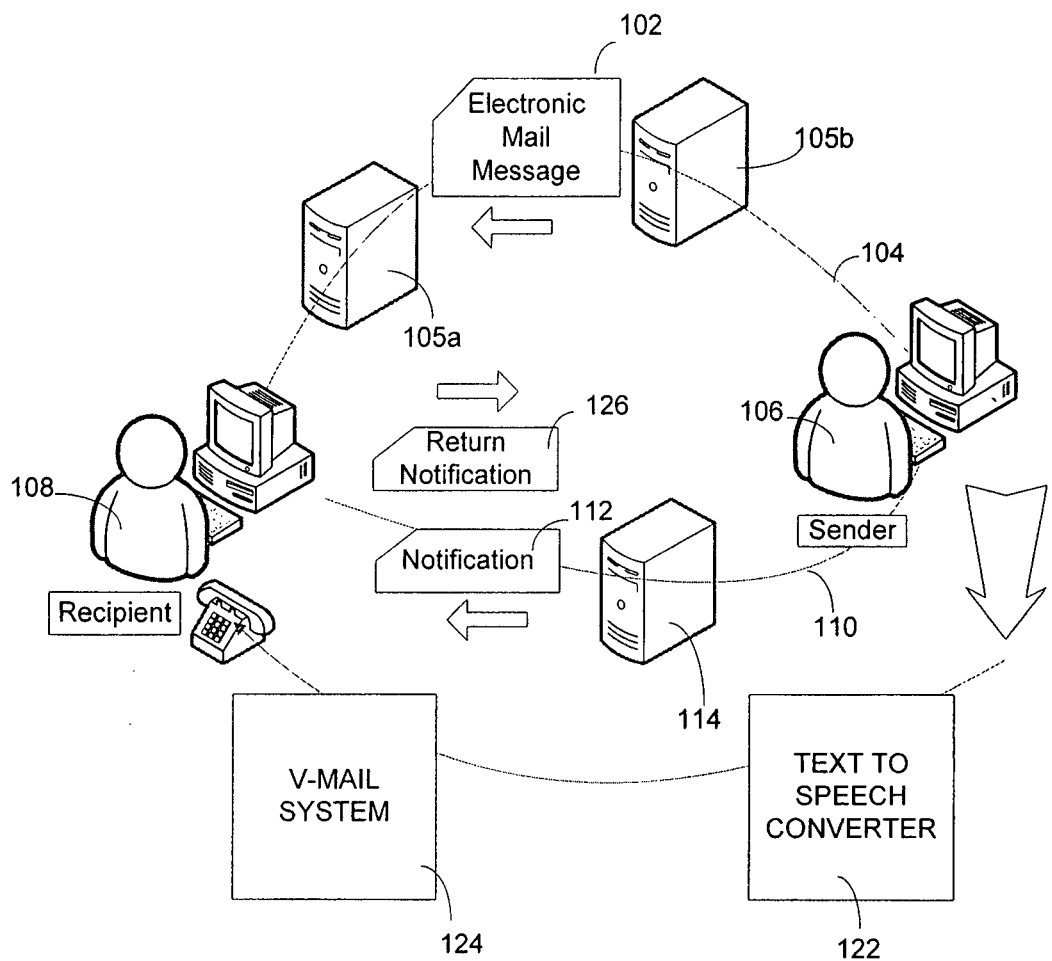

FIGS. 2a-2c illustrate various manners in which the system may adapt to a delay. For example, the system may alert either a sender 106 or a receiver 108 about a delay, such that, in response, information of the message 102 may be communicated using an alternate mechanism.

In the embodiment of FIG. 2a, the recipient 108, identifies a delay upon receiving a notification 112 without also receiving the corresponding electronic mail message within a threshold time. The recipient 108 may then decide to initiate an out-of-band communication. According to some embodiments, the notification 112 may include enough information to alert the recipient 108 as to how to affect a peer-to-peer communication 118 with the sender 106, such as by providing an IP address for the sender 106.

According to another embodiment, as shown in FIG. 2b, the notification 112 may include information that allows the recipient to initiate an IM communication 120 with the sender, such as by providing an IM address. The IM address provided may include the sender's normal IM address, or an ephemeral IM address such that the likelihood of broadcasting information about the recipient may be minimized.

The threshold time between receipt of a notification 112 and an electronic mail message 102 that is used by various embodiments to determine whether a message is delayed may vary widely. According to some embodiments, the threshold time may be of a minute or less, of about an hour or less, of about 12 hours or less, or any other value, as aspects of the invention are not limited in this regard. According to some embodiments, the threshold value may be variable, and in these cases, the value may be defined by a particular user or administrator.

According to some embodiments, the recipient 108, upon identifying a delayed electronic mail message 102, may choose to communicate with the sender 106 through the notification channel 110. This may be accomplished with a return notification 126, as shown in FIG. 2c. The sender 106, upon being notified of the delay by the return notification 126, may then communicate the information of the electronic mail message out-of-band to the recipient 108. The return notification may include information instructing the sender on how to contact the recipient, or the sender may use existing knowledge about the recipient to initiate an out-of-band communication.

According to the embodiment illustrated in FIG. 2c, the server 105b of the sender 106 may, upon receiving a return notification, automatically convert information 113 of the electronic mail message to speech, via a text-to-speech converter 122. The information may then be relayed, out-of-band, to a voice mail system 124 of the recipient 108, or forwarded in any other suitable way. By way of example, according to one embodiment of a voicemail system, the text of an electronic mail message is converted to speech which is then vocalized directly to the intended recipient over a telephone line, either to a person or a machine.

Figure 3:
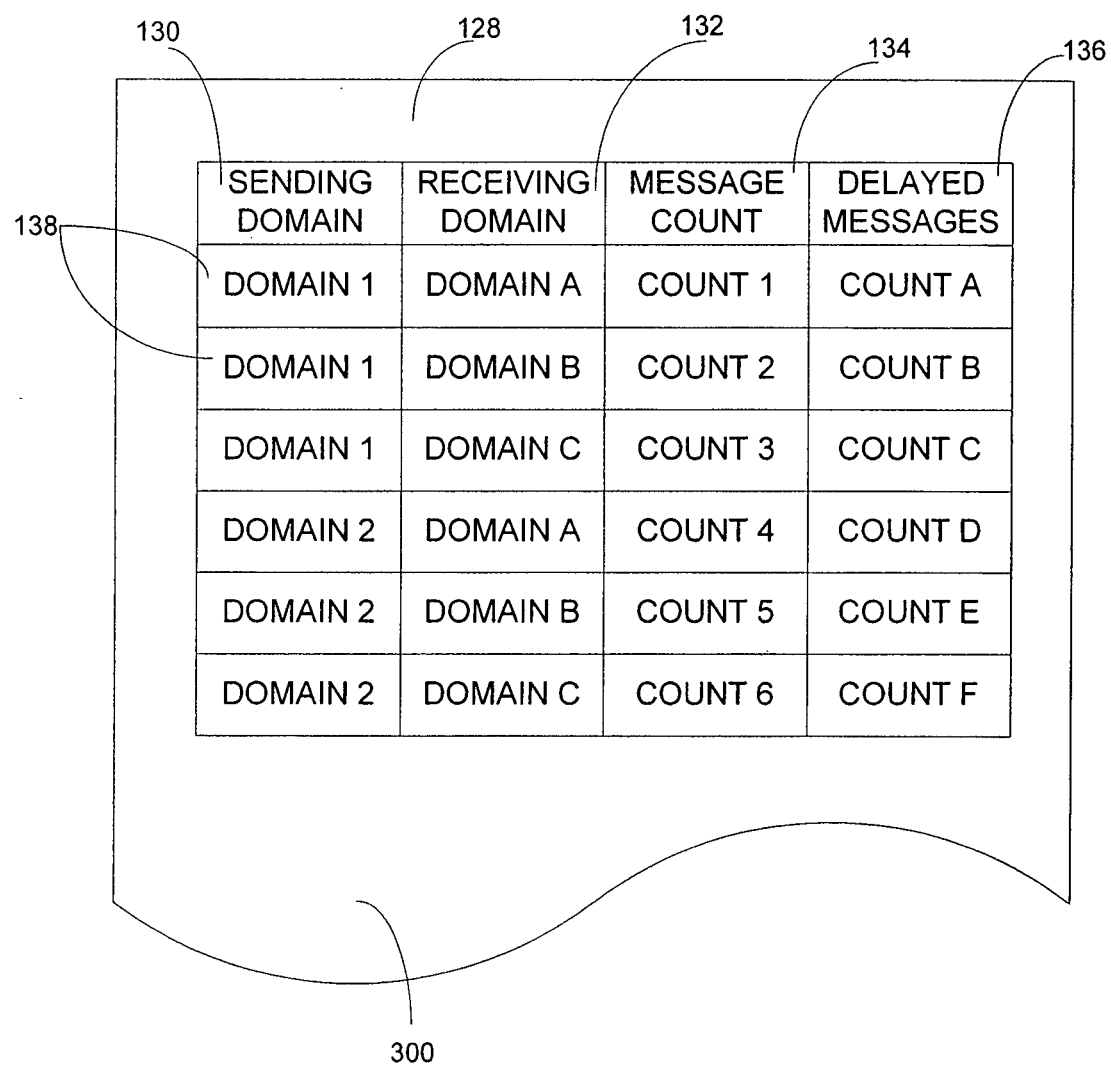
FIG. 3 is a representation of a data structure for storing aggregate delay information, according to one embodiment.

FIG. 3 shows one embodiment of a structure 128 that may be used in the aggregation of delay information 116, as discussed herein. The data structure may be stored in computer-readable media 300 associated with any device that may aggregate historical delay information. For example, in the embodiment of FIG. 1, delay information may be sent to notification server 114 and the data structure of FIG. 3 may be associated with server 114. However, the specific location or locations at which the data structure of FIG. 3 is stored is not a limitation on the invention.

The information in the data structure of FIG. 3 may convey delay information about multiple paths. In the embodiment illustrated, each path is defined by a sending domain and a receiving domain. However, a path may be defined in any suitable way and the data structure of FIG. 3 may be configured to store any suitable type of data to define a path. For example, a path may be defined by a specific sending and/or receiving server or one or more other servers, gateways or other devices used to communicate e-mail messages.

As shown in the example, data may be organized to include a column that reflects the sending domain 130 for a delayed electronic mail message 102, and a column to reflect a receiving domain 132 for the delayed message. In this respect, each row 138 of data in the data structure 128 represents a path 104 between a sender and a recipient and some part of the information in a row defines the path.

Other information in a row may indicate a historical delay for the path. In the embodiment illustrated, a message count 134 reflects the total amount of messages that have been communicated along each pathway between sending a receiving pairs. Additionally, the total amount of delayed messages 136 may be reflected in a separate column of the data structure 128. This information allows a computation of a rate of delayed messages during a first interval of time, which may be used predict a delay for subsequent messages sent over the path. Though, different or additional data may be stored to reflect different or additional characteristics of historical delay. For example, information about the length of delay in a path may also be stored. In some embodiments, the historical delay information may contain counts of numbers of messages that have delays of differing lengths, allowing a histogram of delay durations to be created. Accordingly, the specific format of the data used to indicate historical delay is not critical to the invention.

A data structure as depicted in FIG. 3 may be used in a process in which historical delay information is used to predict delay for a subsequent e-mail message. If a delay, or a delay exceeding a threshold is predicted, the sender may be notified of the delay so that the sender may adapt to the delay.

Figure 4:
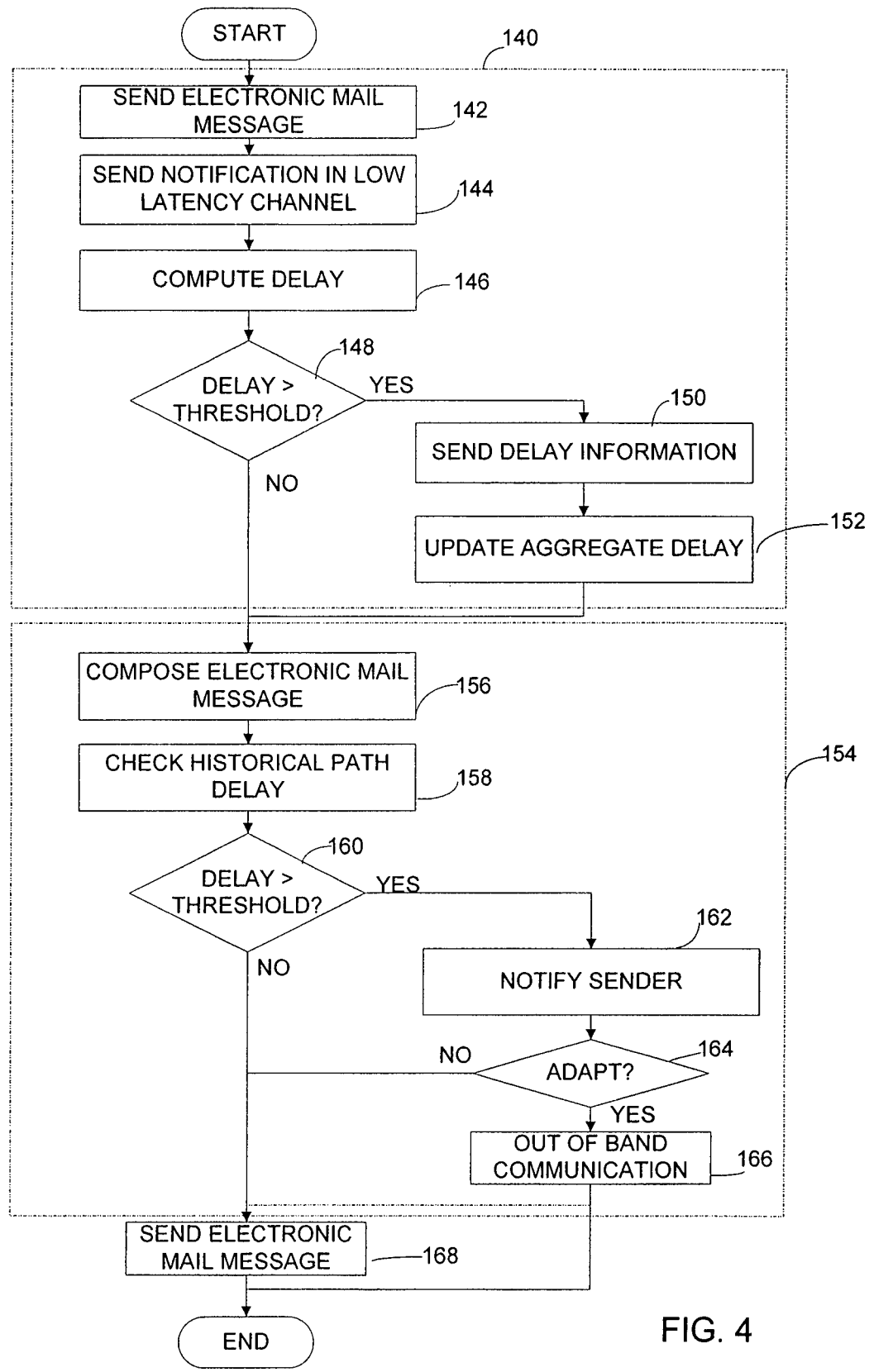
FIG. 4 is a flow chart of an electronic mail message sending process that includes identifying a potential delay and notifying the sender of the potential delay, according to one embodiment.

One embodiment of a process by which a sender is alerted of a potential delay is represented by the flowchart of FIG. 4. As shown, during sub process 140, which may occur at a first time period, one or more electronic mail messages are sent 142. Notifications that correspond to each to each of the electronic mail messages are also sent 144 via a low-latency channel, like the notification channel discussed herein. A recipient 108 computes any delay 146 associated with the delivery of the electronic mail message, such as by periodically measuring the time between receipt of the notification and the current time. A determination 148 is made as to whether the computed delay exceeds a threshold value before the electronic message is received. When the threshold is exceeded, delay information is sent 150. The delay information may be used to update aggregate delay information 152.

The subprocess may be repeated for each of a plurality of e-mails sent over any number of paths, creating aggregate delay information for multiple paths. A sender may use the aggregate delay information during a second time period 154 to determine whether a potential delay exists in the electronic mail system. In particular, the sender may determine whether a delay exists on a path, or some portion of that path, that the sender intends to utilize. In the example of FIG. 3, a path is represented by a sender and a recipient domain. A delay, for example, may be predicted when historical information indicates a delay for messages between the same sender and recipient domains. Though, in some embodiments, a delay over even a portion of that path may be used to predict a delay for a subsequent e-mail message. For example, historical delay information indicating a delay in one or more paths that include the recipient domain may be used to predict a delay.

The subprocess during time 154 may begin when the sender composes an electronic mail message 156, at which time, aggregate delay information is queried to check the sender-to-receiver path for historical delays 158. A determination may then be made as to whether the extent of historical delays exceeds a threshold value 160, and the sender may be notified 162 when the threshold is exceeded. The threshold value may vary according to embodiment, but in some instances may be about ½ hour, about 1 hour, about 6 hours, and any other duration of time, as aspects of the invention are not limited in this respect. When the threshold is not exceeded, the electronic mail message may be sent 168 without notifying the sender.

As part of the notification 162, the sender of the e-mail may be prompted for input regarding whether the sender wishes to take one or more actions in response to a predicted delay. One such action may be initiation of out-of-band communication with the intended recipient. If so, the process may branch from decision block 164 to block 166 where the sender, or any suitable device, may initiate an out-of-band communication 166, such out-of-band communication in addition to notifying the sender of a potential delay and/or sending the electronic mail message 168.

Figure 5:
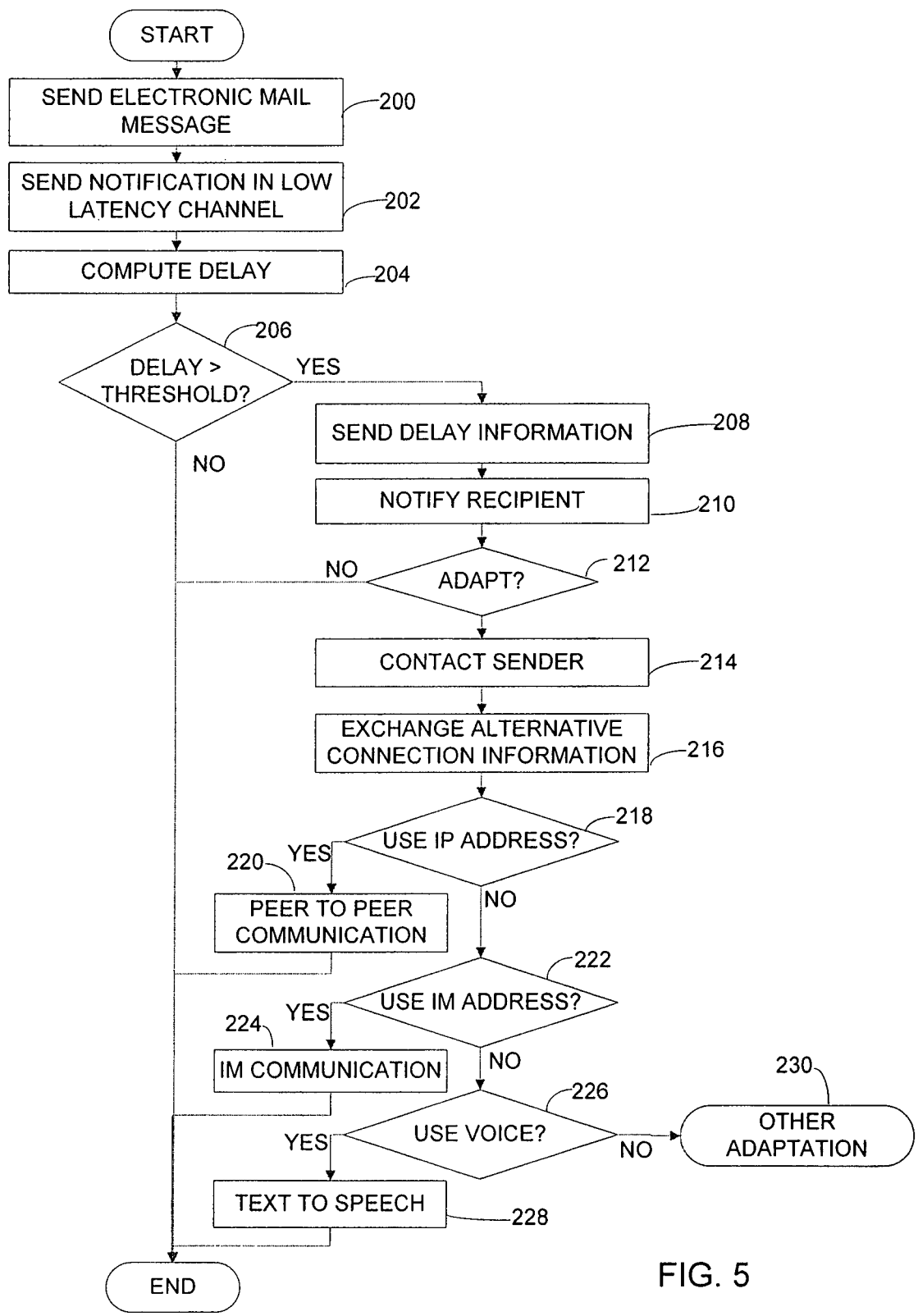
FIG. 5 is a flow chart of an electronic mail receiving process that includes providing an option for out-of-band communication in response to detection of a delay.

FIG. 5 shows one illustrative embodiment of a process for providing an out-of-band communication option to an intended recipient in response to detecting a delay. The process begins by sending an electronic mail message 200 and a notification. As in other embodiments, the notification may be sent in a low-latency channel 202 separately from the electronic mail message 200. The delay associated with the electronic mail message begins to be computed 204 when the notification is received. When that delay exceeds a delay threshold 206, delay information may be communicated to the recipient 208, 210.

In the embodiment illustrated, a single message communicating delay information is sent once the computed delay exceeds a threshold. In embodiments in which the delay is identified before the e-mail message is received but the communicated delay information indicates the magnitude of the delay, updates to the delay information may be sent as more time passes and the e-mail message is not received.

Regardless of the number and format of the delay information messages, upon detecting a delay, the recipient can also determine whether to adapt 212 to a mode of communication other than the electronic mail system. When the recipient chooses to adapt the mode of communication, the sender is contacted 214 and alternative connection information may be exchanged 216. Alternately, users of the electronic mail system may exchange contact information when the notification system is set up. In such embodiments, the notification may include information that identifies at which of a number or previously identified locations the sender is located. According to some embodiments, exchanging communication information may include exchanging an IP address to allow a peer-to-peer communication 220 to be established. As shown, the recipient may be prompted 218, to determine whether peer-to-peer communication is preferred. Additionally, the recipient may be prompted 222 to determine whether an IM communication 224 with an IM address 22, or prompted 226 to determine whether a voice communication 226 that utilizes a text to speech conversion 228 may be preferred.

Figure 6:
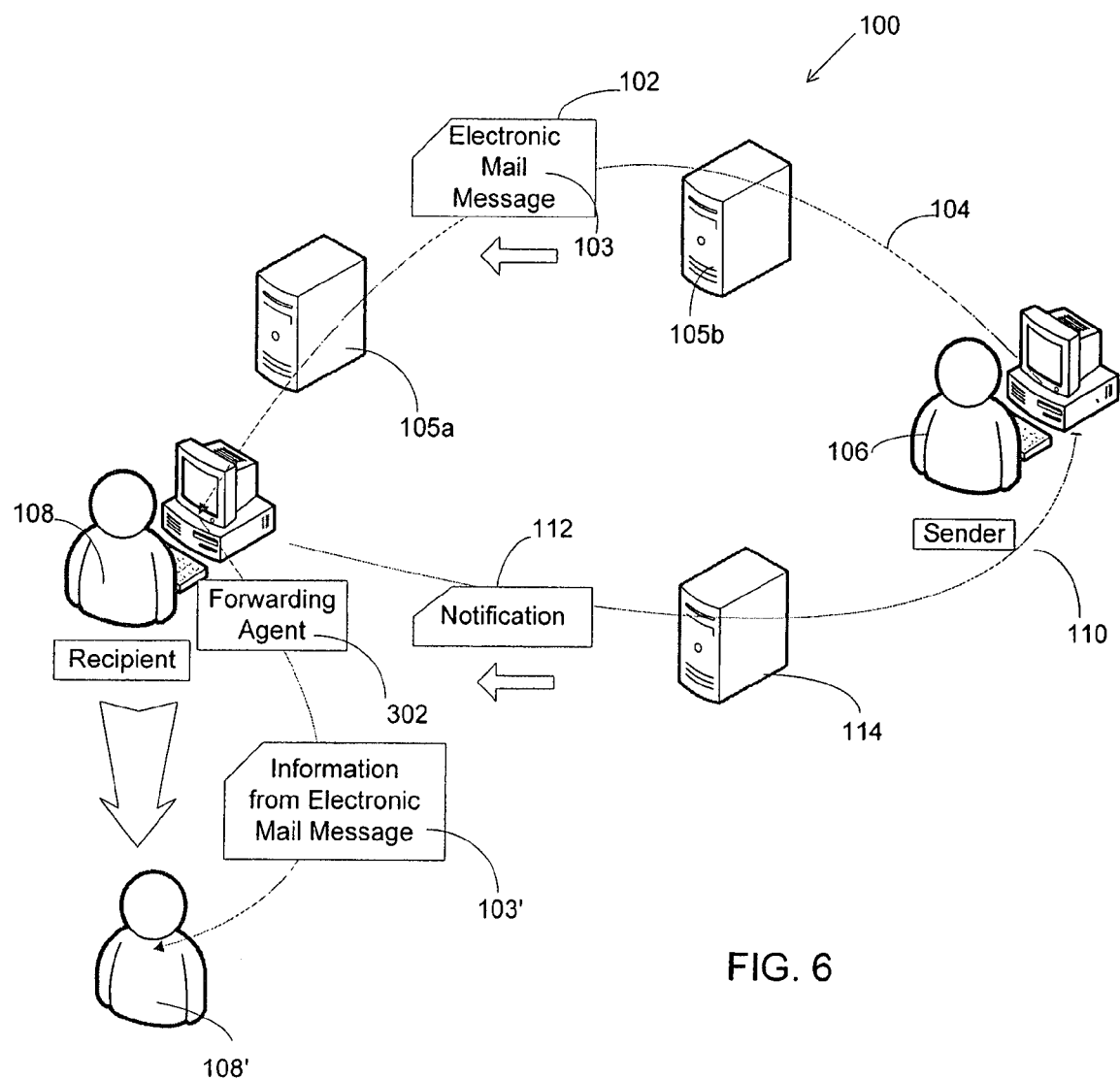
FIG. 6 is a schematic representation of an electronic mail network that utilizes delay notification such that a recipient may designate an out-of-band communication on which information of an electronic mail message may be forwarded, when received, according to one embodiment.

The ability to detect delayed delivery of e-mails may be used to improve the user experience for senders and/or intended recipients of e-mail messages. According to one embodiment, as shown in FIG. 6, a system 100 includes a pathway 104 over which information 103, in the form of an electronic mail message 102 is sent from a sender 106 to a recipient 108. The system also includes a low-latency notification channel 110 over which notifications 112 that correspond to each electronic mail message may be sent. As with other embodiments discussed herein, the notification 112 includes a small amount of information, relative to the typical electronic mail message 102, which allows the notification 102 to be transmitted within much lower likelihood of being delayed.

The receipt of a notification 112 without the corresponding electronic mail message 102 may provide an indication of a delayed electronic mail message to the recipient. This indication may be presented to the recipient once the notification 112 is received and a threshold amount of time passes without the corresponding electronic mail message 102 also being received. However, the specific mechanism by which delay information is provided to an intended recipient is not critical to the invention and any suitable mechanism may be used. For example, the indication may be provided by the recipient viewing a queue where notifications 112 that have been received without their corresponding electronic mail messages 102 are listed.

The recipient may initiate communication via an alternate mechanism in response to the indication of a delayed electronic mail message 102. According to some embodiments, the recipient may use a forwarding agent 302 to automatically transfer information of the electronic mail message to a specified destination once the electronic mail message is available. In the embodiment illustrated, forwarding agent 302 may be a software component executing as part of a e-mail client on a recipient's computer. In such an embodiment the information may be transferred when the e-mail reaches the recipient's computer. A recipient may be particularly interested in taking such action when they receive indication of a delayed electronic mail message 102 and expect to be away from their computer in the near future.

A forwarding agent 302 may allow the recipient to deliver the information 103 of the electronic mail message 102 by various mechanisms. According to some embodiments, information 103 is passed through a text to speech converter, such that the converted information 103' can be conveyed to the recipient 108' at a location remote from the recipient's computer configured to receive the e-mail the information may be conveyed in any suitable way, such as in a voice mail system or to a cellular telephone of the recipient 108'. The information may be transferred out-of-band by other mechanisms as well. According to one embodiment, the electronic mail message, once received, is sent to another e-mail address that has been designated by the recipient. Still, other mechanisms, like Instant Messaging addresses are possible, as aspects of the invention are not limited in this respect.

According to some embodiments, in response to receiving a delay notification the recipient may contact the sender, out-of-band, prior to the electronic mail message being received. To this end, the notification 112 may include data that identifies the sender 106, at least to the recipient 108. The recipient may use this information along with prior knowledge on how to contact the sender 106 to initiate out-of-band communication. Though, in some embodiments the notification may include sender's contact information. According to some embodiments, the notification may include information that alerts the recipient as to which of several locations the electronic mail message was sent, such as a home computer and an office computer of the sender 106.

Figure 7:
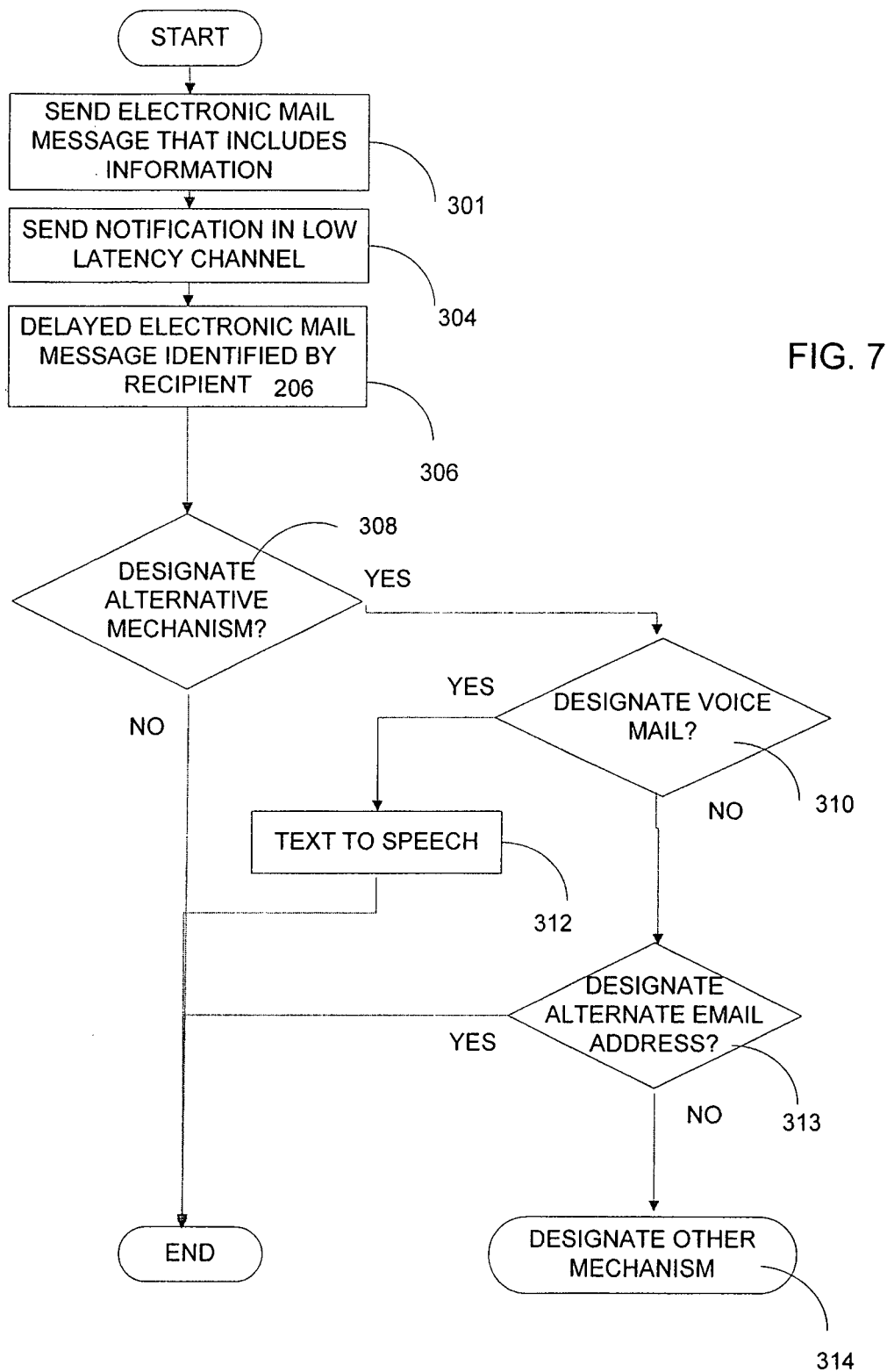
FIG. 7 is a flow chart of an electronic mail receiving process that includes providing an option for out-of-band communication in response to detection of a delay, according to one embodiment.

FIG. 7 shows one illustrative embodiment of a process for providing an out-of-band communication in response to a recipient receiving an indication of an electronic mail message 102. The process begins by the sender sending an electronic mail message 301 and a corresponding notification 304 via a low-latency channel. The delayed electronic mail message is identified 306 by the recipient, typically when the notification is received without the electronic mail message also being received after some specified duration of time. The recipient then decides 308 whether to designate an out-of-band communication, such as via a forwarding agent 302 through which the information 103 of the electronic mail message 102 is to be conveyed.

The recipient 108 next determines which type of out-of-band communication to utilize, and the destination 108' to which the information 103' will be sent. As shown in FIG. 7, voice mail 310 is one option that may be available to the recipient 108 via a forwarding agent 302. Here, the information 103 of the electronic mail message may pass through a text-to-speech 312 converter prior to being transferred to the recipient 108' at a designated voice mail system or other telephonic destination. The forwarding agent 302 may also allow the recipient to designate an alternate e-mail address 313, or any other mechanism 314 as a type of out-of-band communication.

Figure 8:
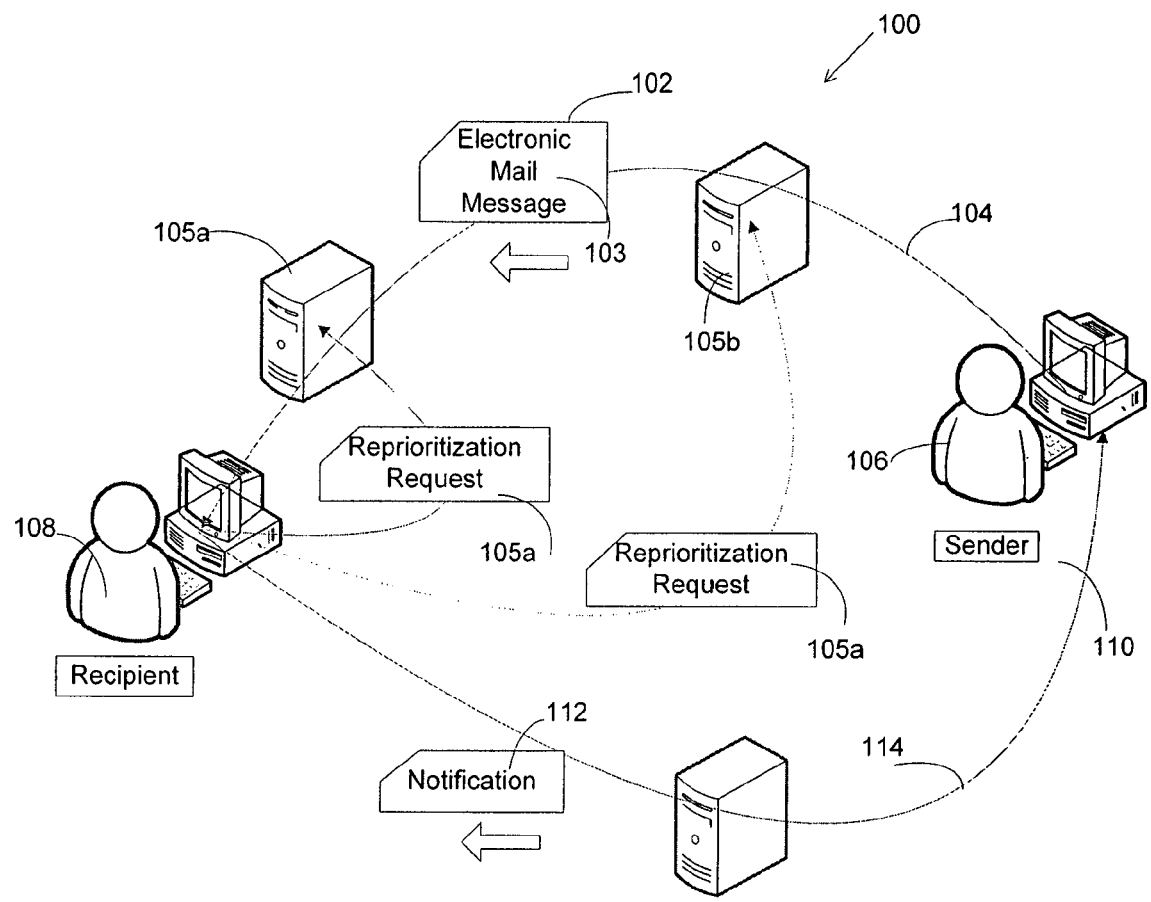
FIG. 8 is a schematic representation of an electronic mail network that provides an option for reprioritization of an electronic mail message in response to a delay notification, according to some embodiments.

A recipient may also use a delay notification to take other action. For example, delays may be the result of congestion in a mail server. An e-mail system may be configured to allow a user to request an e-mail server to re-prioritize delivery of e-mail messages so that an important delayed e-mail may be delivered more quickly. FIG. 8 shows one illustrative embodiment of an electronic mail message system that may be used to detect and adapt to delayed electronic mail messages. As shown, the system includes at least one sender 106 and at least one recipient 108. A pathway 104 that includes at least a recipient e-mail server 105a and a sender e-mail server 105b constitutes a path 104 over which an electronic mail message may be sent. The system also includes a low-latency channel 114 over which a notification 112 may be delivered from the sender to the recipient and that corresponds to the electronic mail message 102, which allows delayed electronic mail messages 102 to be identified by the recipient 108, as discussed herein. The recipient 108, upon receiving an indication of a delayed electronic mail message, may request reprioritization 316 of the delayed electronic mail message 102 relative to other electronic mail messages on the recipient e-mail server 105b, or in some cases, on the sender e-mail server 105a.

Figure 9:
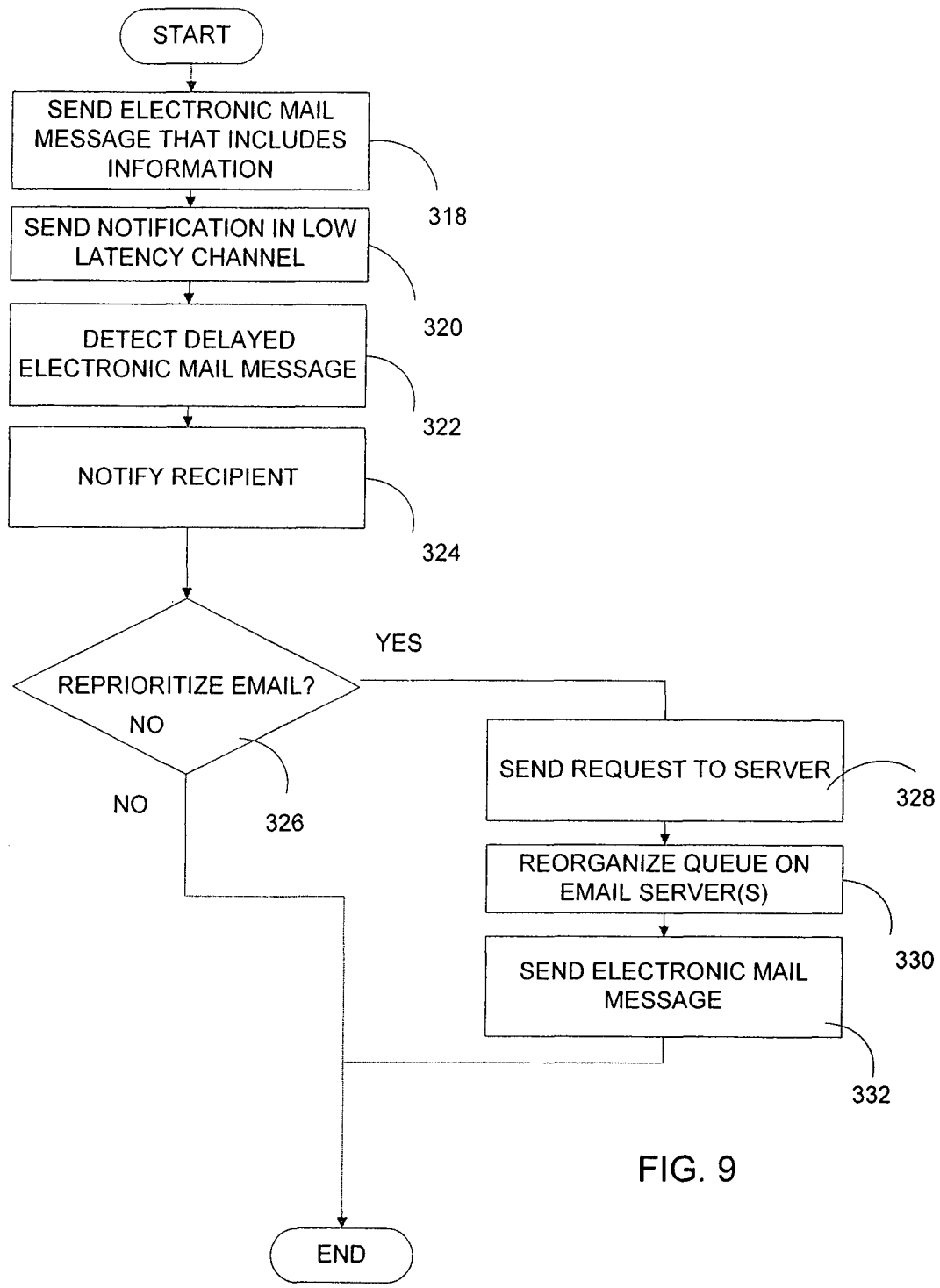
FIG. 9 is a flow chart of an electronic mail receiving process that includes an option for reprioritizing an electronic mail message in response to detection of a delay.

FIG. 9 depicts one process through which a recipient may adapt to a delayed electronic mail message 102 by requesting reprioritization on a electronic mail sever 105a, 105b. The process begins when a sender 106 sends an electronic mail message 318 that includes information 103 to be conveyed to the recipient 108. A notification 112 that corresponds to the electronic mail message is also sent 320 via a low-latency channel. A delayed electronic mail message is detected 322, such as by the passage of a threshold amount time after receipt of a notification without the corresponding electronic mail message. The recipient is notified 324 of the delayed electronic mail message, and is then provided with an option of requesting reprioritization of the e-mail 326. If chosen, the recipient's e-mail system may send a request to a server, such as the recipient's e-mail server 105a. The server 105a may reprioritize delivery of e-mail messages in any suitable way. For example, if server 105a has received e-mail 326 and stored it in a queue, server 105a may reorganize the queue 330 that contains the delayed electronic mail message 102 to place e-mail 326 at or near the top of the queue. The delayed electronic mail message may then be sent 332 to the recipient 108. As another example, server 105a may remove the e-mail from the queue and deliver it directly. As a further alternative, if the e-mail has not yet been received, server 105a may set a filter to identify the e-mail when received so that it is processed directly without being engraved.

Embodiments of the system may be configured to determine how the recipient may alter the priority of the electronic mail message 102. By way of example, in some embodiments, a server 105a, 105b, upon receiving a reprioritization request, may increase the priority of the electronic mail message 102 only as it relates to other electronic mail messages that are being delivered to the recipient 108. Alternately, the server 105a, 105b may be configured to increase the priority of the electronic mail 102 message 102 relative to all other messages that exist on a queue of the server 105a, 105b. In such embodiments, the delayed electronic mail message 102 may be removed from the queue entirely and delivered directly to the intended recipient 108.

Embodiments of the system may include features that regulate how electronic mail messages 102 may be reorganized on the queue of a server 105a, 105b. According to some embodiments, electronic mail messages 102 of a select group of users may be reprioritized relative to any other messages on a given queue, while the messages of other users may only be moved incrementally on a queue. In some approaches, recipients may be limited to the number of reprioritization requests that may be made in a given interval of time, such that the recipient does not simply identify every delayed e-mail for reprioritization. Still, other strategies for regulating how messages are reorganized on a queue are possible, as aspects of the invention are not limited in this respect.

Figure 10:
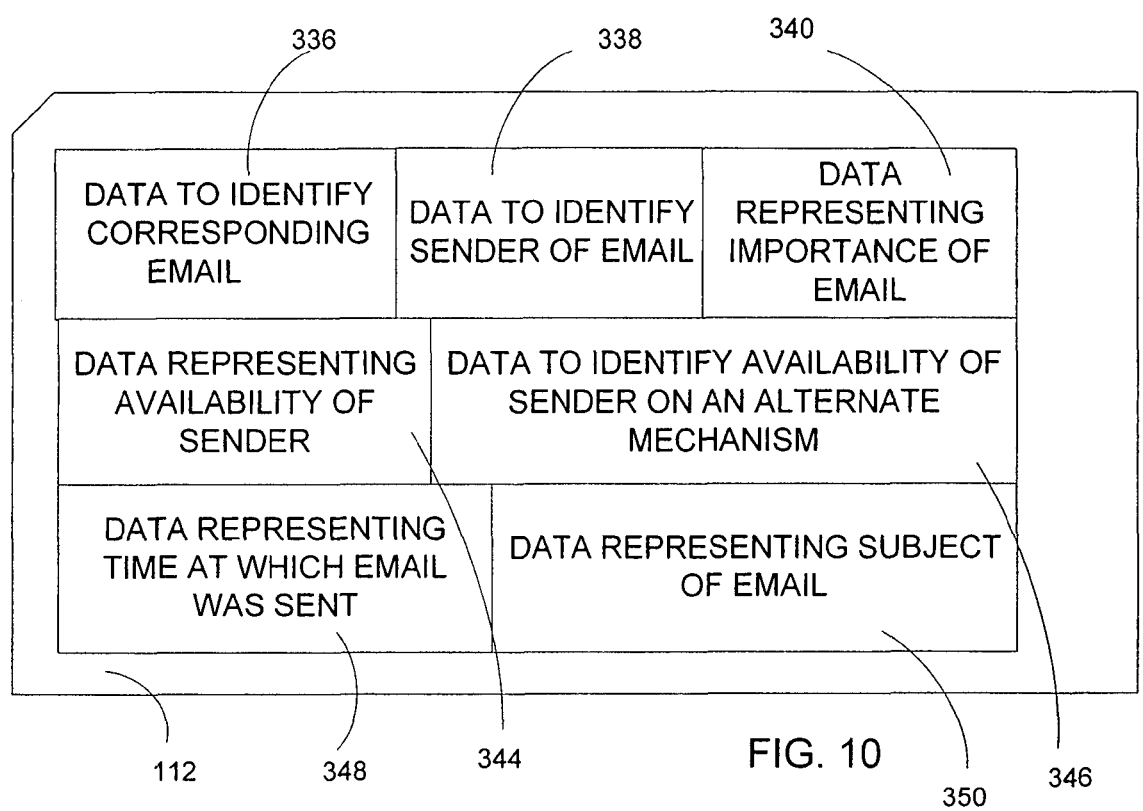
FIG. 10 is a representation of a data structure for a notification that may be sent over a low-latency channel.

Notifications that allow a recipient to identify a delayed e-mail, such as notification 112, may be implemented in any suitable way. FIG. 10 is a representation of a data structure that may be employed to hold information communicated in notification 112 according to some embodiments. As shown, the notification 112 includes a data field to identify the corresponding e-mail 336 and a data field to identify a sender 106 of the e-mail 338. Various embodiments of notifications 112 may include any number of the additional fields represented in FIG. 10. One of such fields may represent the importance 340 or priority level of an e-mail, which may prove useful in alerting the recipient 108 as to whether to take action if the corresponding electronic mail message experiences a delay. Notifications may include a data field that provides information relevant to the sender's availability 342, such as whether or how long the sender will be present at a place from which the notification was sent. For example, a value in field 342 may indicate that the sender is in the sender's office. Data fields may also be used to identify the availability of the sender on an alternate mechanism 346, such as a voice mail system, a peer-to-peer system, or various computers that the sender may be known to use. Fields may be incorporated into the notification that represent a time at which an electronic mail message 102 was sent 348. Additionally or alternatively, a field that includes all or a portion of the subject of an electronic mail message 350 may be incorporated into a notification 112.

Embodiments of the notifications may be configured according to a fixed format. In this respect, the size of notifications may be kept small to promote rapid delivery on a low-latency channel. According to some embodiments, the notifications are limited to fewer than 500 bytes, fewer than 250 bytes, fewer than 100 bytes, fewer than 50 bytes, or even smaller amounts, as aspects of the invention are not limited in respect.

Having thus described several aspects of at least one embodiment of this invention, it is to be appreciated that various alterations, modifications, and improvements will readily occur to those skilled in the art.

For example, in the embodiments described above, an e-mail was sent from a single sender to a single recipient. The number of people, entities or devices acting as senders or receivers is not critical to the invention. For example, an e-mail message may be sent to multiple recipients and delivery of such a message may be delayed to any or all of such recipients. As another example, forwarding agent 302 may be located on an e-mail server, such as server 105a or 105b.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   receiving, by a recipient device at a recipient email address, a notification that an electronic mail message has been sent from a sending device to the recipient device, the notification being separate from the electronic mail message and received by the recipient device before the recipient device receives the electronic mail message;
   after the notification is received by the recipient device and before the electronic mail message is received by the recipient device:
      providing an indication to a user of the recipient device that the electronic mail message has been sent from the sending device and not yet received by the recipient device, the indication being based at least in part on the notification and indicating that the electronic mail message is delayed, and configuring, based on input from the user of the recipient device, a forwarding agent of an email client of the recipient device to forward information of the electronic mail message to the user of the recipient device when the electronic mail message is received at the recipient device, the forwarding agent being configured to forward the information of the electronic mail message to:

a cellular telephone other than the recipient device, or a location that is remote from the recipient device at an alternative email address that is different than the recipient email address;

receiving the electronic mail message at the email client of the recipient device after configuring the forwarding agent; and after receiving the electronic mail message at the email client of the recipient device, forwarding the information of the electronic mail message via the forwarding agent of the email client from the recipient device to the cellular telephone or to the location that is remote from the recipient device at the alternative email address.

2. The method of claim 1, further comprising:

forwarding, by the forwarding agent, the information of the electronic mail message to the user of the recipient device via a voice mail system.

3. The method of claim 2, further comprising converting the information of the electronic mail message to speech and transferring the speech to the voice mail system.

4. The method of claim 1, wherein configuring the forwarding agent comprises selecting the notification from a queue of notifications awaiting corresponding other electronic mail messages.

5. The method of claim 1, further comprising:

identifying that the electronic mail message is delayed by comparing a current time to a time when the notification corresponding to the electronic mail message arrived at the email client.

6. The method of claim 1, further comprising:

forwarding, by the forwarding agent, the information of the electronic mail message to the user of the recipient device via an instant messaging service.

7. One or more computer-readable memory devices or storage devices comprising computer-executable instructions which, when executed by one or more processors, cause the one or more processors to perform acts comprising:

receiving, by a recipient device at a recipient email address, a notification that an electronic mail message has been sent from a sending device to the recipient device, the notification being separate from the electronic mail message and received by the recipient device before the recipient device receives the electronic mail message;

after the notification is received by the recipient device and before the electronic mail message is received by the recipient device:

providing an indication to a user of the recipient device that the electronic mail message has been sent from the sending device and not yet received by the recipient device, the indication being based at least in part on the notification and indicating that the electronic mail message is delayed, and configuring, based on input from the user of the recipient device, a forwarding agent of an email client of the recipient device to forward information of the electronic mail message to the user of the recipient device when the electronic mail message is received at the recipient device, the forwarding agent being configured to forward the information of the electronic mail message to:

a cellular telephone other than the recipient device, or a location that is remote from the recipient device at an alternative email address that is different than the recipient email address;

receiving the electronic mail message at the email client of the recipient device after configuring the forwarding agent; and after receiving the electronic mail message at the email client of the recipient device, forwarding the information of the electronic mail message via the forwarding agent of the email client from the recipient device to the cellular telephone or to the location that is remote from the recipient device at the alternative email address.

8. The one or more computer-readable memory devices or storage devices of claim 7, the acts further comprising:

forwarding, by the forwarding agent, the information of the electronic mail message to the user of the recipient device via a voice mail system.

9. The one or more computer-readable memory devices or storage devices of claim 8, the acts further comprising:

converting the information of the electronic mail message to speech and transferring the speech to the voice mail system.

10. The one or more computer-readable memory devices or storage devices of claim 7, wherein configuring the forwarding agent comprises selecting the notification from a queue of notifications awaiting corresponding other electronic mail messages.

11. The one or more computer-readable memory devices or storage devices of claim 7, the acts further comprising:

identifying that the electronic mail message is delayed by comparing a current time to a time when the notification corresponding to the electronic mail message arrived at the email client.

12. The one or more computer-readable memory devices or storage devices of claim 7, the acts further comprising:

forwarding, by the forwarding agent, the information of the electronic mail message to the user of the recipient device via an instant messaging service.

13. A recipient device comprising:

executable instructions configured to:

receive, by the recipient device at a recipient email address, a notification that an electronic mail message has been sent from a sending device to the recipient device, the notification being separate from the electronic mail message and received by the recipient device before the recipient device receives the electronic mail message;

after the notification is received by the recipient device and before the electronic mail message is received by the recipient device:

provide an indication to a user of the recipient device that the electronic mail message has been sent from the sending device and not yet received by the recipient device, the indication being based at least in part on the notification and indicating that the electronic mail message is delayed, and configure, based on input from the user of the recipient device, a forwarding agent of an email client of the recipient device to forward information of the electronic mail message to the user of the recipient device when the electronic mail message is received at the recipient device, the forwarding agent being configured to forward the information of the electronic mail message to:
   a cellular telephone other than the recipient device, or
   a location that is remote from the recipient device at an alternative email address that is different than the recipient email address;
receive the electronic mail message at the email client of the recipient device after configuring the forwarding agent; and
after the electronic mail message is received at the email client of the recipient device, forward the information of the electronic mail message via the forwarding agent of the email client from the recipient device to the cellular telephone or to the location that is remote from the recipient device at the alternative email address, and
at least one hardware processor configured to execute the instructions.

14. The recipient device according to claim 13, wherein the instructions are further configured to:
   forward, by the forwarding agent, the information of the electronic mail message to the user of the recipient device via a voice mail system.

15. The recipient device according to claim 14, wherein the instructions are further configured to:
   convert the information of the electronic mail message to speech and transfer the speech to the voice mail system.

16. The recipient device according to claim 13, wherein the instructions are further configured to:
   configure the forwarding agent responsive to a selection of the notification from a queue of notifications awaiting corresponding other electronic mail messages.

17. The recipient device according to claim 13, wherein the instructions are further configured to:
   compare a current time to a time when the notification corresponding to the electronic mail message arrived at the email client to identify that the electronic mail message is delayed.

18. The recipient device according to claim 13, wherein the instructions are further configured to:
   forward, by the forwarding agent, the information of the electronic mail message to the user of the recipient device via an instant messaging service.

19. A system comprising the recipient device of claim 13 and a notification server configured to send the notification to the recipient device.

20. The system according to claim 19, further comprising a sender email server configured to send the electronic mail message to the recipient device.

\* \* \* \* \*